3,464,340
PRESET MECHANISM OF DIAPHRAGM FOR SINGLE LENS REFLEX CAMERA
Yoshihisa Maitani, Tokyo, Japan, assignor to Olympus Optical Co., Inc., Tokyo, Japan
Filed Mar. 1, 1966, Ser. No. 530,815
Claims priority, application Japan, Mar. 11, 1965, 40/19,243
Int. Cl. G03b 9/02
U.S. Cl. 95—64     4 Claims

ABSTRACT OF THE DISCLOSURE

A preset mechanism for a single lens reflex camera having a blade diaphragm arrangement attached within the lens holder of the camera. The rotatably secured diaphragm blades are moved by a spring-loaded diaphragm drive ring so that upon rotation and release of the diaphragm drive ring the diaphragm blades can set themselves to the preselected aperture position.

---

The present invention relates to a preset mechanism for a diaphragm for a single lens reflex camera, more particularly, to a preset mechanism for a diaphragm having a precise operative character and durable construction.

Concerning the preset mechanism for a diaphragm, it is well understood by anyone skilled in the art that a predetermined magnitude of the aperture of a diaphragm is obtained by means of shifting a position of fulcrum of an actuating member which can be operated from the outside of the lens holder. One of the above mentioned mechanism comprises actuating members disposed radially to an axis of lens holder in a movable condition of each fulcrum of the actuating members, and the actuating members are connected with a shutter button disposed on the lens holder, respectively. Therefore, it was necessary to have a portion of the actuating member projected outside of the lens holder and moreover all interchangeable lenses must be provided with a shutter button, and it is impossible to provide an operation for closing the aperture of the diaphragm to the predetermined magnitude during only the period of the exposing operation of the camera.

The inventor has disclosed other types of preset mechanism for a diaphragm but the precision of the preset operation is rather inferior to that of the present invention, because a longer actuating member compared with that of the present invention is provided.

In the present invention, a preset mechanism of the diaphragm is normally in the fully opened condition but has such operative characteristics that, after the focusing operation in a fully opened condition of the diaphragm while looking at a reflection of the object reflected by a reflex mirror; the swingable reflex mirror swings out of the path of the light rays when a shutter button is pushed and at the same time blades of the diaphragm are rotated to a preset condition; just after the above mentioned preset closing operation of the diaphragm a shutter actuates so as to take picture on a film; then the reflex mirror returns to the normal position in the path of the light rays by means of operative action of a quick return mechanism; and at the same time the blades of the diaphragm return to the fully opened condition, without manual operation.

Further features and advantages of the invention will be apparent from the ensuing description with reference to the accompanying drawings in which.

Figure 1:
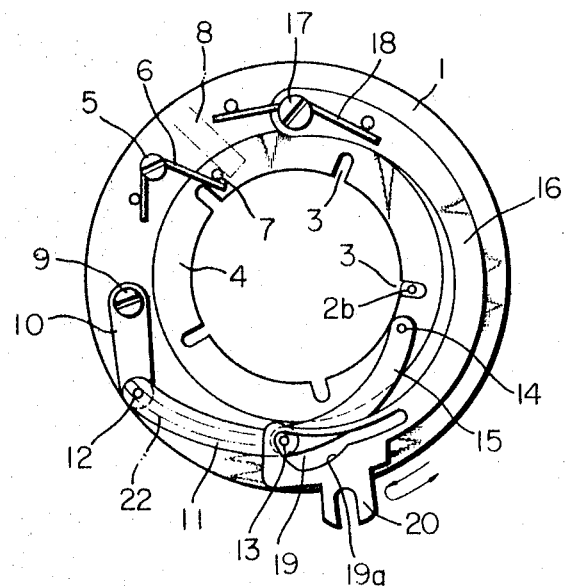
FIG. 1 is a front view of an embodiment of the present mechanism for diaphragm, in a fully opened condition of preset ring member of diaphragm, showing the relative position of movable members, according to the present invention.
Figure 2:
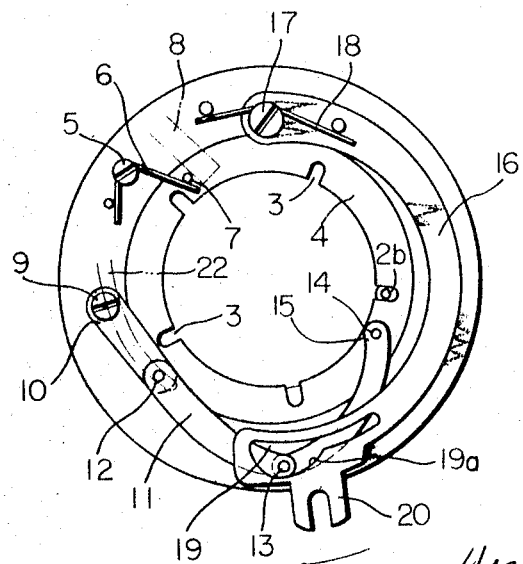
FIG. 2 is a front view of a preset mechanism corresponding to that of FIG. 1, but with the preset ring member of diaphragm in a preset condition.
Figure 3:
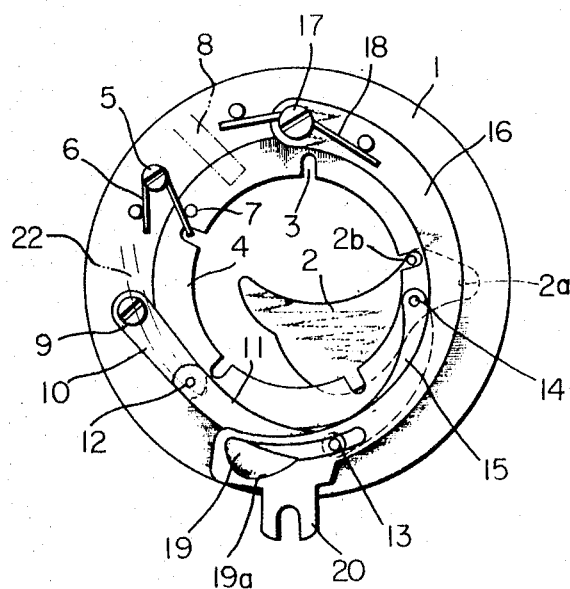
FIG. 3 is also a front view of a preset mechanism corresponding to that of FIG. 1, but showing a blade of diaphragm closed to a predetermined position.
Figure 4:
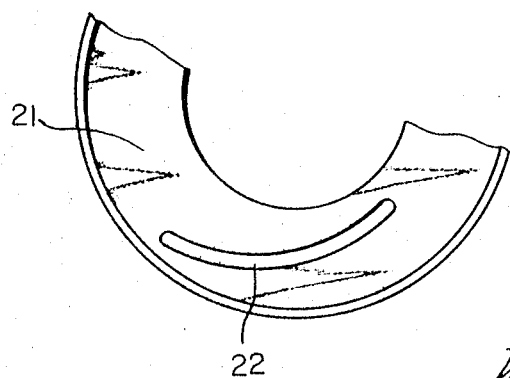
FIG. 4 is a front view of a preset ring member of diaphragm according to the present invention.

In the drawings of FIGS. 1, 2, and 3, a lens holder is omitted to show an annular plate 1 secured to the lens holder perpendicularly to the optical axis of the lens. A rotatable annular plate 4 is provided behind the annular plate 1 rotatable about the optical axis of the lens and is provided with a plurality of recesses 3 which are spaced at equal distance from each other. A plurality of blades 2 are swingably pivoted to the annular plate 1 at equal distance spaced from each other by means of pins 2a secured to the plate 1 and each engaging with a corresponding hole at one end of the blade 2, each of blades 2 of the diaphragm being provided with an upwardly projecting pin 2b disposed adjacent to an end portion of each blade. Pin 2b of each blade is engaged within the respective recess 3 of the rotatable annular plate 4 so as to rotate each of the blades 2 about the respective pins 2a, thereby permitting the magnitude of the aperture of the diaphragm to be varied, by rotating the rotatable annular plate 4 about the optical axis of the lens. The above mentioned mechanism is well known in the art. A spring 6 is provided around a pin 5 secured at a suitable position to the fixed annular plate 1 with the outward movement of one end of the spring 6 being limited by means of a pin rigidly secured to said annular plate 1 while the other end of the spring 6 contacts a pin 7 secured to the rotatable annular plate 4, so as to urge the same in the clockwise direction, as shown in the drawings. A stopper 8 normally contacts pin 7 so as to limit the clockwise rotation of the rotatable annular plate 4. By the above-mentioned condition, the diaphragm is normally kept in the fully opened condition. An end of a rocking arm 10 is pivoted to the annular plate 1 by a pivot 9, and the other free end of the rocking arm 10 is articulated with an end of movable lever plate 11 by a pin 12, and a pin 13 is rigidly secured at the other end of the movable lever plate 11. And one end of connecting lever plate 15 is connected to the movable annular plate 4 by a pivot 14 and the other free end of the lever plate 15 is articulated with the other end of the movable lever plate 11 by the pin 13. An end of a curved operating arm plate 16 is pivoted to the annular plate 1 by a pivot 17 as shown in the drawing. A wire spring is provided around the pivot 17 and the outward movement of one end of the spring 18 is limited by a pin rigidly secured to the annular plate 1 while the other end of the spring 18 contacts a pin secured to the operating arm plate 16 so as to urge the arm plate 16 counterclockwise. A guide aperture 19 is formed in the free end of the operating arm plate 16 while the free end of the arm 16 is provided with a fork shaped plate 20 extending outwardly of the annular plate 1, as shown in FIGS. 1, 2 and 3. The inner edge of the aperture 19 acts as a cam surface so as to control the position of the pin 13. A control annular plate 21 is disposed on the lens holder in a coaxial and parallel relation with the annular plate 1 so as to rotate about the optical axis of the lens. The control annular plate 21 is located in front of the annular plate 1 and fragmentarily shown generally in phantom outline in the drawings. An arcuate groove 22 is formed eccentrically in the control annular plate 21 and the pin 12 engages within the arcuate groove 22 as shown in FIGS. 1, 2 and 3, but with the slot or groove 22 more clearly shown in FIG. 4. The engagement of the arcuate groove 22 with the pin 12 in various positions is seen by the dotted line in each of FIGS. 1, 2 and 3. The relative angular position of the control annular plate 21 with respect to the lens holder is indicated by the respective symbols (not shown) in a scale (not shown) which is provided on the outer surface of the lens holder cooperating with an index and indicates the relative aperture of the lens. The setting of the control annular plate 21 is achieved by click stop means (not shown).

FIG. 1 shows the condition in which a shutter coupled with a winding mechanism of the film and a spring of a swingable reflex mirror are energized as the film loaded within the single lens reflex camera is wound up by one frame. In the above mentioned condition shown in FIG. 1, blades 2 of the diaphragm are in the fully opened condition with the arcuate groove 22 of the control annular plate 21 being in a preset position for taking a picture under the fully opened condition of the blades 2 of the diaphragm by setting the control annular plate 21 at the extreme end of the counterclockwise rotation thereof relative to the lens holder. In FIG. 2, the arcuate groove 22 is in a preset position for taking a picture under the minimum opening of the lens by setting the control annular plate 21 at the extreme end of the clockwise rotation thereof relative to the lens holder. In the preset condition of the control annular plate 21 as shown in FIGS. 1 and 2, when the shutter button is pushed, the shutter is actuated and the swingable reflex mirror (not shown) swings out of the optical path of the light rays so as to take picture on a film, and when the reflex mirror returns to the normal viewing position in the optical path of the light rays by the operation of a quick return mechanism caused by the movement of the forked portion 20 of the arm plate 16 to a predetermined distance leftward and backward to the original position by the forward and rearward motion of an actuating member (not shown) which is coupled with the shutter mechanism (not shown), as shown in the drawings of FIGS. 1 and 2.

In a condition shown in FIG. 1, the above mentioned motion of the forked portion 20, that is, a guide aperture 19, does not influence pin 13, therefore, the blades of the diaphragm do not move with the aperture being kept at the fully opened condition whereas, in a condition shown in FIGS. 2 and 3, when the forked portion 20 moves leftward (FIG. 3) from the position shown in FIG. 2, the cam edge 19a of the guide aperture 19 pushes the pin 13 in the inward direction, so that the movable arm plate 11 causes the annular plate 4 to be rotated counterclockwise by means of the interposition of a connecting plate 15, so as to decrease the aperture of the diaphragm to the minimum condition when the picture is being taken. As shown in FIGS. 2 and 3, when the aperture formed by the blades 2 is to be reduced, the extent of the reduction of the aperture depends upon a relative position of the pin 12 to the annular plate 1, which pin defines the position of the movable arm plate 11. And as the position of the pin 12 depends upon a relative rotative position of the preset control annular plate 21 to the lens holder, the above-mentioned preset of the diaphragm can be obtained by adjustably setting the preset annular plate 21 with respect to the lens holder, by the aid of the symbols in the scale indicating the relative aperture of the lens.

In the above embodiment, since the length of the movable plate 11 is made sufficiently short so as to prevent deformation thereof by the displacement of the fulcrum, and the movable plate 11 is connected to the rotatable annular plate 4 through the connecting plate 15, and the force actuating the blades is given by the connection of plates 11 and 15, the movable plate 11 is not deformed during the operation and the precise operation of the preset of the diaphragm is obtained.

What is claimed is:

1. In a single lens reflex camera, a pre-set mechanism for a multiblade, diaphragm attached in a lens holder of said camera, said pre-set mechanism for the diaphragm comprising means for effecting return motion of the blades of said diaphragm to a normally open condition, means for pre-setting the condition of said blades in a predetermined condition, means for actuating said blades in relation to a motion of shutter mechanism by which, when said shutter mechanism is actuated, said actuating means actuates said pre-setting means so as to close said blades (2) in a pre-set condition, and after taking a picture, said blades return to normal full opened condition by the action of said means for effecting motion of the blades while said means for actuating the blades returns to its original position, said means for effecting return motion of the blades, comprises a first stationary annular plate (1) rigidly and coaxially secured to said lens holder, a second rotatable annular plate (4) rotatably and coaxially disposed behind said first annular plate (1) on the lens side, and latter rotatable annular plate (4) provided with a plurality of equal-spaced recesses (3) disposed at its inner peripheral edge, a flat spring (6) disposed on said first annular plate (1) and one end of said spring being limited its outward movement by a pin disposed on said first annular plate (1); a pin (7) disposed on said second movable annular plate (4) to receive an expansion force of said flat spring (6); a stopper (8) for limiting the rotation of said movable annular plate (4) around its axis by the expansion force of said spring (6); each blade (2) of said diaphragm pivoted (2a) to said first annular plate (1) and provided with pin (2b) engaging with respective recess (3) of said rotatable annular plate (4), whereby, in a normal condition, said spring (6) presses said pin of said movable annular plate so as to abut said stopper (8) in which condition said blades (2) are kept in full opened condition; and when said movable annular plate (4) is rotated to compress said flat spring (6), during which condition said blades (2) are moved to closed condition by the action of said means of actuation, said pin (7) reacts against said stopper (8), and when said means of actuation returns said movable annular plate (4) to its original free condition, said spring (6) presses said pin (7) so as to engage with said stopper in which condition said blades return to normal full opened condition.

2. A preset mechanism for a diaphragm according to claim 1, in which, said means for setting the condition of said aperture by said blades (2) of said diaphragm in a predetermined condition, comprises a rocking arm 10 pivoted (9) with its one end to said stationary annular plate (1), a movable lever plate (11) articulated at its one end with free end of said rocking arm (10) by a connecting pin (12), a connecting lever plate (15) pivoted at its free end to the other end of said movable lever plate (11) by a first pivot pin (13) and pivoted at its other end (14) to said rotatable annular plate (4), a control annular plate (21) disposed on said lens holder in a coaxial and parallel relation adjacent to said stationary annular plate (1) so as to rotate around the light axis of the lens of said camera, said control annular plate (21) being operated by hand from the outside of said lens holder, an arcuate groove (22) disposed eccentrically on said control annular plate (21) so as to engage with said connecting pin (12) of said rocking arm (10).

3. A pre-set mechanism for a diaphragm according to claim 1, in which, means for actuating said blades (2) of the diaphragm comprise a curved operating arm plate (16) pivoted at its one end to said stationary annular plate (1) by fixed second pivot pin (17) so as to provide one stroke of angular oscillation around said second fixed pivot pin (17) responsive to actuation of the shutter mechanism, a guide aperture (19) disposed at the free end of said operating arm plate (16) so as to engage with said first pivot pin (13) of said connecting lever plate (15) by which the position of said means for setting the condition of the aperture by said blades is controlled, a flat spring (18) having means mounting it on said stationary annular plate (1) so as to provide a potential energy to rotate the free end of said operating arm plate (16) toward the outward direction of the lens holder, by which, when the shutter mechanism works, said curved operating arm plate (16) rotates its free end in an inward direction in relation with the motion of shutter mechanism so as to press said connecting pin (12) of said rocking arm 10 and to rotate said rotatable annular ring (4) for closing the blades (2) in the predetermined condition, and after taking picture, when the shutter mechanism returns to its free condition, said curved operating arm plate (16) returns to its original position by the repulsive force of said spring (18), and the rotatable annular plate (4) rotates to its normal position by the effect of said first-mentioned spring (6) so as to return the aperture of the blades of diaphragm to its normal full opened condition.

4. In a single lens reflex camera, a preset mechanism for a diaphragm mounted in an optical lens holder of said camera comprising:
  (a) a first stationary annular plate (1) mounted coaxial with the optical axis of the lens and rigidly attached to said lens holder;
  (b) a second annular plate (4) rotatably and coaxially mounted behind said first annular plate (1) on the lens side, and having a plurality of equal-spaced recesses (3) disposed in its inner peripheral edge,
  (c) the diaphragm comprises a plurality of blades (2) each pivotally mounted to the stationary plate (1) and spaced relative to each other as to form a variable diaphragm opening
  (d) each of said diaphragm blades (2) having a pin (2b) attached normal thereto and engageable with the respective recesses (3) in said rotatable annular plate (4), whereby said blades (2) may be moved responsive to reciprocal rotation of said rotatable annular plate (4) to vary the diaphragm opening, said latter diaphragm being normally open;
  (e) resilient means for normally biasing said rotatable annular plate (4) in a fully open diaphragm position and including lever means for effecting movement of said diaphragm blades (2)
  (f) said resilient means including a first flat spring (6) disposed on said first stationary plate (1) with one end of the spring being limited in its outward movement by a pin on said first plate (1); a second pin (7) mounted on the second movable plate (4) against which the other end of said spring engages to transmit the expansive force of the spring thereto;
  (g) a stop arm (8) mounted in said lens holder for limiting rotation of said rotatable annular plate (4) upon engagement of said second pin (7) thereagainst in which position the blades (2) are fully open;
  (h) actuation means for selectively rotating said second plate (4) to compress said first flat spring (6) and responsive thereto the blade pins in said recesses and the above-mentioned link means cooperate with said blades whereby they are moved to a temporarily closed condition, and upon release of the actuation means, said first spring (6) reacts to rotatively return said second plate (4) and the interconnected blades (2) to their normal fully open position;
  (i) said lever means of paragraph (3) includes
    (1) a rocking arm (10) pivotally mounted at one end to said stationary annular plate (1) adjacently spaced from said first spring (6),
    (2) a movable lever plate (11) pivotally connected at one end to the free end of said rocking arm (10) by means of a first connecting pin (12);
    (3) a connecting lever plate (15) pivotally mounted at one end (14) on said rotatable plate (4) with the other end pivotally connected to the other end of said movable lever plate (11) by means of a second connecting pin (13);
    (4) a curved operating arm plate (16) pivotally mounted at one end on said stationary annular plate (1) by a mounting pin (17) spaced arcuately from said first flat spring (6) in a direction opposite that of the mounting of said rocking arm (10);
    (5) said operating arm plate (16) driveable for reciprocal swinging movement through a predetermined angle responsive to operation of the camera to take an exposure; and said arm plate (16) having cam means (19), (19a) engageable by said second connecting pin (13) which pivotally interconnects movable lever plate (11) to said connecting lever plate (15), whereby the latter lever plate (15) is moved responsive to said camera operation to effect rotation of said rotatable annular plate (4) to close the diaphragm blades (2);
    (6) an aperture control annular plate (21) mounted coaxially with said first stationary annular plate (1) and having arcuate eccentric groove means (22) disposed to be operatively engaged by said first connecting pin (12) whereby said pin (12) and the aforesaid levers it connects are selectively shiftable by rotation of said aperture control annular plate (21) to vary the amount of rotation of said second annular rotatable plate (4) by means of said movable lever plate (11) and said connecting lever plate (15), responsive to operation of the camera.

References Cited

UNITED STATES PATENTS

| 2,935,922 | 5/1960 | Rentschler. | |
| 3,051,067 | 8/1962 | Goshima | 95—64 |
| 3,165,997 | 1/1965 | Sugano et al. | |
| 3,308,734 | 3/1967 | Spiessl | 95—64 |

FOREIGN PATENTS 774,852    5/1957    Great Britain.

NORTON ANSHER, Primary Examiner
JOSEPH F. PETERS, JR., Assistant Examiner